United States Patent [19]

Bahlenberg

[11] Patent Number: 5,761,194
[45] Date of Patent: Jun. 2, 1998

[54] ARRANGEMENT IN A MOBILE COMMUNICATIONS SYSTEM FOR EXTENDING THE RANGE BETWEEN ONE OR MORE MOBILE UNITS AND A BASE STATION

[75] Inventor: Gunnar Bahlenberg, Lulea, Sweden

[73] Assignee: Telia AB, Farsta, Sweden

[21] Appl. No.: 481,506

[22] PCT Filed: Dec. 17, 1993

[86] PCT No.: PCT/SE93/01080

§ 371 Date: Sep. 20, 1995

§ 102(e) Date: Sep. 20, 1995

[87] PCT Pub. No.: WO94/17605

PCT Pub. Date: Aug. 4, 1995

[30] Foreign Application Priority Data

Jan. 21, 1993 [SE] Sweden ............... 9300162-6

[51] Int. Cl.[6] .................. H04B 7/14; H04J 1/10; H04J 3/08

[52] U.S. Cl. ............. 370/315; 370/321; 370/337; 370/347; 455/404; 455/524

[58] Field of Search ............. 370/246, 315, 370/321, 332, 336, 337, 335, 350, 349, 347; 455/56.1, 54.2, 524, 404; 379/59, 60

[56] References Cited

U.S. PATENT DOCUMENTS

| | | | |
|---|---|---|---|
| 3,628,147 | 12/1971 | Makino | 370/315 |
| 4,713,809 | 12/1987 | Mizota | 370/315 |
| 4,788,711 | 11/1988 | Nasco, Jr. | 455/404 |
| 4,882,765 | 11/1989 | Maxwell et al. | 455/18 |
| 5,159,593 | 10/1992 | D'Amico et al. | 370/332 |
| 5,423,067 | 6/1995 | Manabe | 455/524 |

FOREIGN PATENT DOCUMENTS

| | | |
|---|---|---|
| 245024 | 11/1987 | European Pat. Off. |
| 418103 | 3/1991 | European Pat. Off. |
| 442617 | 8/1991 | European Pat. Off. |
| 523687 | 1/1993 | European Pat. Off. |
| 2195869 | 12/1988 | United Kingdom |

*Primary Examiner*—Wellington Chin
*Assistant Examiner*—Melissa Kay Carman
*Attorney, Agent, or Firm*—Oblon, Spivak, McClelland, Maier & Neustadt, P.C.

[57] ABSTRACT

A mobile radio system includes a number of base stations operating with time frames and mobile units operating with low transmitting power. The range between an affected mobile unit and an affected normal base station is extended by means of a repeating function. The repeating function can be effected from a functionally subordinated base station which operates with a short range. The functionally subordinated base station is placed between the normal base station and the mobile units. Each subordinated base station is arranged to detect affected mobile units which call the normal base station and to forward the calls and the information which the affected mobile units transmit to the normal base station.

20 Claims, 1 Drawing Sheet

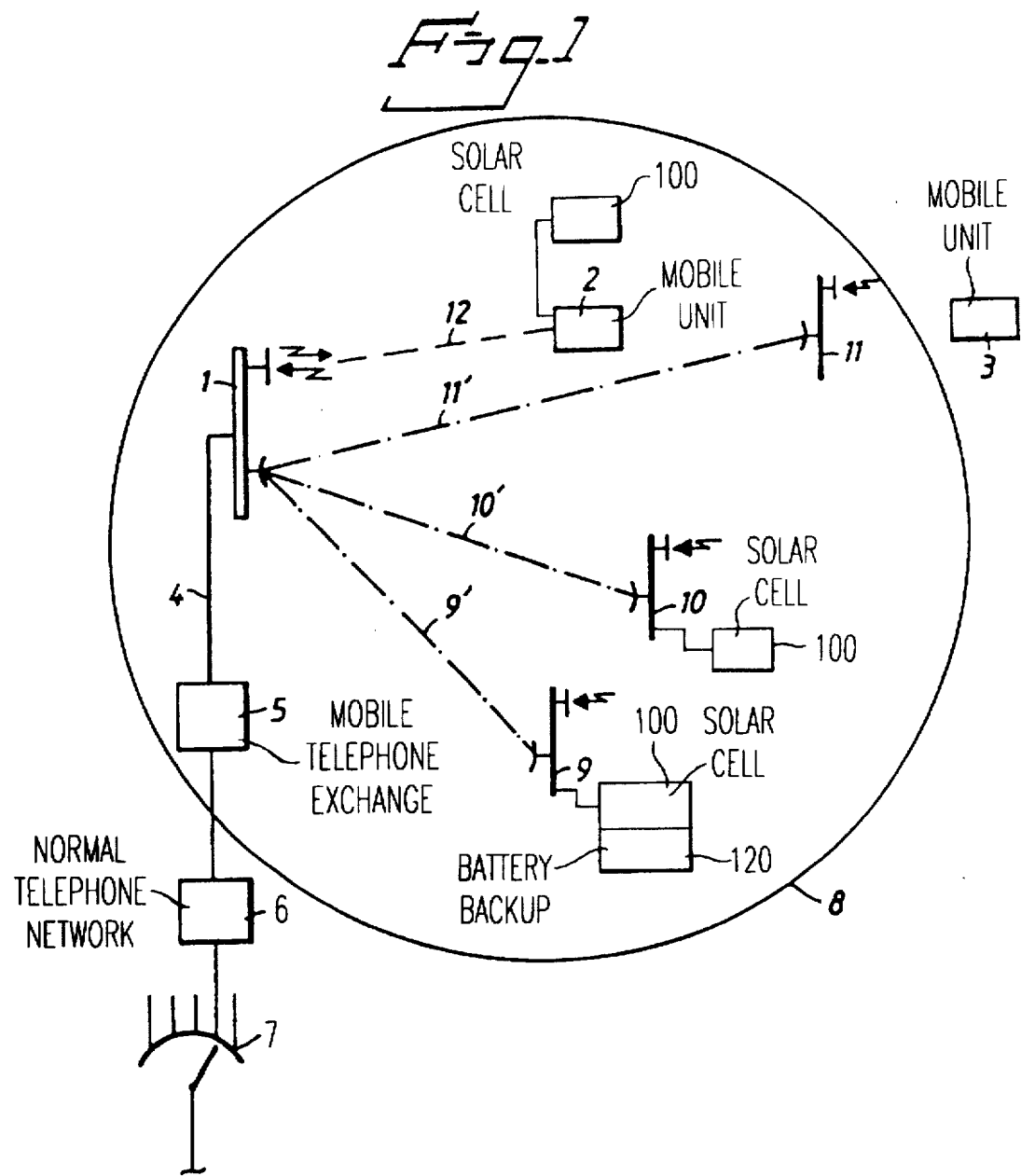

ARRANGEMENT IN A MOBILE COMMUNICATIONS SYSTEM FOR EXTENDING THE RANGE BETWEEN ONE OR MORE MOBILE UNITS AND A BASE STATION

TECHNICAL FIELD

The present invention relates to an arrangement for producing an improved/extended range between the mobile units and the base station in a mobile digital communication system which includes base stations operating with time frames and mobile units operating with low transmitting power.

PRIOR ART

In digital radio systems which operate with time frames and are used in the general mobile telephone network, the coverage between a mobile unit included in a system and a normal base station is limited to the transmission power/output power of the mobile unit. When the mobile unit is located within the coverage area of the normal base station affected and transmits in uplink, it is not certain that the transmitting power/output power of the mobile unit will be sufficient for establishing a connection to the normal base station. In general public relay systems, it is previously known, from Patent Specification EPA-2092237, to use a repeating function for improving the effective coverage area. The repeating function repeats a first sequence of descending time slots in a first time frame from the first to the second station as a second sequence of descending time slots in a second time frame. Furthermore, the repeating function sends a first sequence of ascending time slots to the first station which responds to a second sequence of ascending time slots received from the second station. In cellular mobile telephone systems, it is previously known, from U.S. Pat. No. 4,972,456, to increase the coverage area by utilizing a number of satellite cells, the object of which is to transfer signals between the base station and the user who is located in one of the said satellite cells. Communication between the satellite cell and the base station occurs wirelessly via radio communication. The communication which takes place in both uplink and downlink is consequently carried out via the satellite cell. In mobile radio networks intended for data communication, it is previously known, from U.S. Pat. No. 4,882,765, to utilise a repeater. The repeater listens to the communication between mobile unit and base station and decides itself if a message needs to be repeated or not. The transmission time does not therefore need to be taken up by unnecessary repetitions. The communication is repeated by the repeater both in uplink and downlink.

In connection with digital mobile radio systems belonging to this category and having limited range for the mobile units, a number of methods have been proposed for improving the coverage between the mobile units and the base station by means of a repeating function, among others. The existing proposals, however, have entailed repeating functions with, among others, high power consumption and fixed placements within the coverage area of the normal base station. No known technique for improving the range between the mobile units and the base station in general mobile telephone networks (for example the GSM network) which entails minimum power consumption in the repeating function when no call is in progress, fast transfer of random access information to the normal base station, little time delay for speech during a call and a call channel with high transmission capacity has previously been found.

DESCRIPTION OF THE INVENTION

TECHNICAL PROBLEM

Current modern digital mobile telecommunication systems presuppose the widest possible effective coverage between a normal base station and mobile units in the network at the same time as being able to give the greatest possible consideration to the low output power that hand-portable mobile units are arranged to operate with. Furthermore, it is desirable, in present-day mobile telecommunication systems, to be able to introduce repeating units/ functions, which repeating units/functions should be possible to place optionally within the coverage area of the normal base station without access to power or fixed connections from the remaining network. It should be possible to increase the coverage areas considerably at locations with low population density and little development of the infrastructure. The repeating unit/function should be able to compensate for the limited range in uplink, that is to say from the mobile unit/mobile units to the normal base station, of the hand-portable mobile units. The invention is intended to be able to solve the above problems, among others.

In one embodiment of the subject-matter of the invention, a base station functionally subordinated to the normal base station is utilised, which subordinated base station should be able to operate with low power and be fed with power at locations with low population density and little development of the infrastructure. Furthermore, the base station functionally subordinated to the normal base station should be possible within an optional area which consists of the coverage area of the normal base station. The invention is intended to be able to solve the above problems.

In a further embodiment of the subject matter of the invention, the mobile communication system is arranged with a selected link connection by means of which selected link connection it should be possible to handle the traffic at the same time in one or more base stations functionally subordinated to the normal base station. The invention is also intended to solve this problem.

In a further embodiment, each mobile unit is arranged to effect calls directly to the normal base station. It should be possible to effect these calls (in uplink) in such a manner that the base stations functionally subordinated to the normal base station are utilized as effectively as possible. The invention is also intended to solve this problem. In a further embodiment of the concept of the invention, base stations functionally subordinated to a respective normal base station are each arranged to operate with a low power state, which low power state should be able to take into consideration the traffic intensity within the affected base station functionally subordinated to the normal base station. The invention is also intended to solve this problem.

In a further embodiment of the subject-matter of the invention, the time slots of the base stations functionally subordinated to the normal base station are displaced in time, which time displacement should be able to compensate for delays within the mobile communication system. Furthermore, each base station functionally subordinated to the normal base station is arranged with an element for detecting calls and acknowledgements. This element should be able to decide about effecting a call via the said subordinated base station. Each base station functionally subordinated to the normal base station is furthermore arranged to measure signal strength. This signal strength should be able to form the basis for effecting and transferring the connected connections of the mobile unit. The invention is intended to solve the problems specified above.

SOLUTION

That which mainly can be considered to be characterizing of an arrangement according to the invention is that a repeating function is effected by means of a base station functionally subordinated to the normal base station. This functionally subordinated base station operates with short range and can be placed optionally between the normal base station and the mobile unit/mobile units. Further characterizing features are that each base station subordinated to the normal base station is arranged to sense or detect affected mobile units which make a call to the normal base station. The base stations subordinated to the normal base station are furthermore arranged to carry out the repeating function and forward the calls and the information/the messages which are transmitted by the affected mobile unit(s) to each affected normal base station.

In one embodiment of the concept of the invention, the base stations functionally subordinated to the normal base station are power-fed by solar cells, preferably using solar cells with battery backup. Furthermore, the base stations functionally subordinated to the normal base station are optionally placeable within the coverage area of the affected base station.

In a further embodiment of the concept of the invention, the communications system is arranged with a synchronization function for each subordinated base station. The synchronization function is effected by means of a link connection which is established for this purpose.

In a further embodiment of the concept of the invention, each of the base stations subordinated to the normal base station is arranged only to forward calls when the affected mobile units cannot directly reach the normal base station. Each of the base stations functionally subordinated to the normal base station is also arranged to operate with a low-power state. Each subordinated base station changes to the low-power state when no traffic is being effected via the said affected subordinated base station. A base station functionally subordinated to the normal base station which has assumed a low-power state has a power consumption which is less than 100 mW.

In a further embodiment of the concept of the invention, the time slots of the base stations functionally subordinated to the normal base station are displaced in time in relation to those of the normal base station in order to compensate for the transit delay. Each functionally subordinated base station is arranged to effect traffic with a capacity of 16 kbit/s per established call channel.

In a further embodiment, each base station functionally subordinated to the normal base station is provided with elements for detecting. The elements for detecting detect calls and acknowledgement of calls from affected mobile units when no connection is established via the said functionally subordinated base station. Furthermore, each base station functionally subordinated to the normal base station is arranged to measure signal strength from affected mobile units. The affected mobile units are connected to surrounding functionally subordinated base stations. The communication system transfers the connection of an affected mobile unit to that base station functionally subordinated to the normal base station which exhibits the highest signal strength value.

ADVANTAGES

By means of that which has been proposed above, an effective mobile communication system can be set up in which the effective coverage area for mobile units and normal base stations can be greatly increased. This type of increased coverage area is especially suitable for being used in locations with low population density and little development of infrastructure (power, connections). Such areas are mainly found in mountainous regions, archipelagos and other sparsely built-up areas. The system is also suitable for emergency telephones in archipelagos and in mountainous regions. The base stations subordinated to the normal base station can be fed with power by solar cells and possibly battery backup, providing that the call intensity is not too high. The result is that the subordinated base stations can be located optionally, without access to power or fixed connections, within the coverage area of the normal base station. The arrangement is particularly suitable for GSM and this type of TDMA system which creates the possibility of a very low energy consumption, in the subordinated base stations, during calls as well, due to the discontinuous transmission.

DESCRIPTION OF THE FIGURE

A presently proposed embodiment of an arrangement which exhibits the characteristics significant of the invention will be described below with simultaneous reference to the attached drawings, where FIG. 1 shows a preferred embodiment of the invention in block diagram form.

FUNCTIONAL EMBODIMENT

FIG. 1 shows a mobile digital telecommunication system comprising partly a number of base stations operating with time frames, one is designated as 1 here, and partly a number of mobile units, two are designated as 2 and 3 here. The base station 1 is connected by means of a connection 4 to a mobile telephone exchange 5. The mobile telephone exchange 5 constitutes the interface to the normal telephone network 6 and is connected to a switching station 7. The mobile communication system can consist of a system known per se, the mobile radio systems with the designations NMT and GSM can be named as examples. In the figure, a coverage area belonging to the base station 1 is designated by 8. The size of the coverage area 8 for a base station 1 in the mobile telecommunication system is limited by the output power which the mobile units 2, 3 are arranged to operate with. Where the mobile units 2, 3 consist of hand-portable mobile telephones, their output power is rather low. Within the coverage area of the base station 1 are placed a number of base stations subordinated to the normal base station 1 here designated by 9, 10, 11. To extend the range, that is to say to increase the coverage area 8 for the normal base station 1, the base stations 9, 10, 11 subordinated to the normal base station 1 are arranged to detect the mobile units 2, 3 when they call the normal base station 1. Each of the base stations 9, 10, 11 subordinated to the normal base station 1 receives messages which are sent from the mobile units 2, 3 to the normal base station 1 and thereafter transmit the said message via a radio link 9', 10', 11' to the normal base station 1. Messages and calls from the normal base station 1 are sent directly to the mobile units 2, 3. When a mobile unit 2 is located within the coverage area 8 of the normal base station 1, calls and messages are sent from the mobile unit 2 directly to the normal base station 1 by means of a radio link 12.

The coverage area 8 of a base station (cell) 1 in a mobile telephone is limited by the low output power from, above all, hand-portable mobile telephones 2, 3. The coverage area can be greatly increased in, for example, sparsly built-up areas, mountainous regions and archipelagos, by a system concept with a normal base station 1 and a network of base stations 9, 10, 11 functionally subordinated to the normal base station. These base stations 9, 10, 11 subordinated to the normal base station can be fed with power by solar cells 100 possibly with battery backup 120, provided that the call intensity is not too high. In FIG. 1, the base stations 9, 10, 11 subordinated to the normal base station are especially adapted to the GSM system and this type of TDMA system, which creates the possibility of a very low power consumption even during calls, due to the discontinuous transmission. These base stations 9, 10, 11 subordinated to the normal base station can therefore be optionally placed without access to power or fixed connections and are particularly suitable for use in locations with low population density and little development of infrastructure (power, connections). The system is also suitable for network telephones in archipelagos and in mountainous regions. The system concept is based on those channels which are to transmit continuously from the network side being handled by the normal base station which operates with high output power and therefore long range. The normal base station 1 leaves all the remaining communication to the base stations 9, 10, 11 subordinated to the normal base station. The base stations 9, 10, 11 subordinated to the normal base station only need to listen for calls and acknowledgements of calls from the mobile units 2, 3 when no connection is established via them. In certain system applications, the base stations 9, 10, 11 subordinated to the normal base station 1 must be accurately synchronized with the normal base station 1. Moreover, the calls must be forwarded to them. For this purpose, a special link connection 9', 10', 11' is set up. During a call in the downlink, that is to say from the normal base station 1 to the mobile units 2, 3, a direct connection from the normal base station to the mobile units is used. For the uplink, that is to say from the mobile units to the normal base stations, the base stations 9, 10, 11 subordinated to the normal base station are intended to forward the call (when the mobile unit 3 does not reach the normal base station 1 directly).

To retain full GSM functionality for the mobile unit 2, 3 connected to the GSM, a number of GSM functions must be modified on the network side. The result of this is that, for the surrounding part of the GSM network, the normal base station 1 including the base stations 9, 10, 11 subordinated to the normal base station look like a single normal cell (with standard GSM interface). The extra functions and interfaces required only affect the normal base station and the base stations 9, 10, 11 functionally subordinated to the normal base station.

The power consumption in the base stations 9, 10, 11 subordinated to the normal base station is much lower than 100 mW when no call is in progress. To achieve this, only the system parts necessary at each time point are provided with current supply. Solar cells in combination with chargeable accumulators can be used as current source.

The mobile units 2, 3 are arranged only to measure the signal strength towards the normal base station and its normal neighbours during the call. To be able to carry out transfer/hand-over between the base stations 9, 10, 11 functionally subordinated to the normal base station, the surrounding base stations 9, 10, 11 functionally subordinated to the normal base station are arranged to measure the signal strength towards the mobile unit 2, 3. This measurement only needs to be taken when the quality and/or signal strength of the call becomes too low and drops below a predetermined limit value. It can even be conceived that the call in the uplink be handed over to another base station 9, 10, 11 functionally subordinated to the normal base station by this base station beginning to receive on the same frequency and in the same time slot, a so-called soft handover.

The invention is not limited to the embodiment shown above as an example but can undergo modifications within the scope of the subsequent patent claims and concept of the invention.

I claim:

1. A subordinate base station, which is functionally subordinate to a main base station in a mobile communications system that includes a mobile station, said subordinate base station and a main base station, wherein said main base station is configured to operate based on time frames, and said mobile station configured to operate with a lower transmit power than said main base station, said subordinate base station being located between said main base station and said mobile station, said subordinate base station comprising:

a transmitter configured to transmit signals over a shorter range than said main base station;

a sensor configured to detect a signal level of a signal sent from said mobile station to said main base station; and a repeating mechanism configured to forward said signal from said mobile station to said base station when said sensor detects that said signal level is less than a predetermined level, wherein said repeating mechanism operates on an uplink from said mobile unit to said main base station, but not on said downlink.

2. The subordinate base station of claim 1, further comprising a solar cell having a battery backup.

3. The subordinate base station of claim 1, wherein said subordinate base station is located within a coverage range of said main base station.

4. The subordinate base station of claim 1, further comprising a selected link connection synchronizing mechanism configured to synchronize an arrival of said signal forwarded by said subordinate base station with signals forwarded by other subordinate base stations.

5. The subordinate base station of claim 1, configured to allow said mobile unit to transmit said signal directly to said main base station when said mobile unit is located within said coverage area of said main base station.

6. The subordinate base station of claim 1, wherein said subordinate base station is configured to operate in a low power operational mode that dissipates less than 100 mW when no signal is being forwarded thereby.

7. The subordinate base station of claim 1, wherein said subordinate base station is configured to compensate for transit delays by displacing time frames used for forwarding the signal with respect to the time frames established at the main base station.

8. The subordinate base station of claim 1, wherein said signal is forwarded at a rate of 16 kbp/s per established call channel.

9. The subordinate base station of claim 1, further comprising:

a detection and acknowledgment mechanism configured to detect a call and acknowledge a call from the mobile unit when the subordinate base station does not connect the mobile station to the base station.

10. The subordinate base station of claim 1, wherein said sensor and said repeating mechanism are cooperatively configured to measure respective signal strengths of signals from other mobile stations connected to other subordinate base stations or the subordinate base station, and effect a hand-over operation to a subordinate base stations that exhibits a highest signal strength value.

11. The subordinate base station of claim 2, wherein said subordinate base station is located within a coverage range of said main base station.

12. The subordinate base station of claim 2, further comprising a selected link connection synchronizing mechanism configured to synchronize an arrival of said signal forwarded by subordinate base station with signals forwarded by other subordinate base stations.

13. The subordinate base station of claim 3, further comprising a selected link connection synchronizing mechanism configured to synchronize an arrival of said signal forwarded by subordinate base station with signals forwarded by other subordinate base stations.

14. The subordinate base station of claim 11, further comprising a selected link connection synchronizing mechanism configured to synchronize an arrival of said signal forwarded by said subordinate base station with signals forwarded by other subordinate base stations.

15. The subordinate base station of claim 2, configured to allow said mobile unit to transmit said signal directly to said main base station when said mobile unit is located within said coverage area of said main base station.

16. The subordinate base station of claim 2, wherein said subordinate base station is configured to operate in a low power operational mode that dissipates less than 100 mW when no signal is being forwarded thereby.

17. The subordinate base station of claim 2, wherein said subordinate base station is configured to compensate for transit delays by displacing time frames used for forwarding the signal with respect to the time frames established at the main base station.

18. The subordinate base station of claim 2, wherein said signal is forwarded at a rate of 16 kbp/s per established call channel.

19. The subordinate base station of claim 2, further comprising:
a detection and acknowledgment mechanism configured to detect a call and acknowledge a call from the mobile unit when the subordinate base station does not connect the mobile station to the base station.

20. The subordinate base station of claim 2, wherein said sensor and said repeating mechanism are cooperatively configured to measure respective signal strengths of signals from other mobile stations connected to other subordinate base stations or the subordinate base station, and effect a hand-over operation.

* * * * *

UNITED STATES PATENT AND TRADEMARK OFFICE
CERTIFICATE OF CORRECTION

PATENT NO. : 5,761,194
DATED : June 2, 1998
INVENTOR(S) : Gunnar BAHLENBERG

It is certified that error appears in the above-identified patent and that said Letters Patent is hereby corrected as shown below:

On the title page, item [87], the PCT Publication Date should be:

--PCT Pub. Date: Aug. 4, 1994--

Signed and Sealed this

Ninth Day of February, 1999

Attest:

Attesting Officer

Acting Commissioner of Patents and Trademarks